(No Model.)
F. A. JACOBSEN.
CORN AND COTTON PLANTER.
No. 390,678. Patented Oct. 9, 1888.
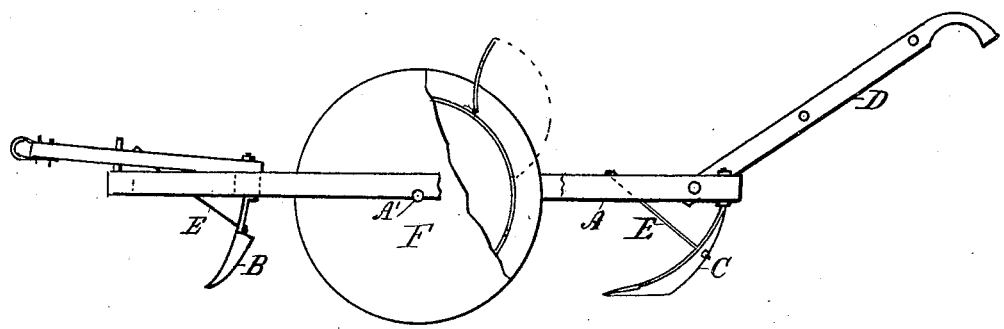
Fig. I.
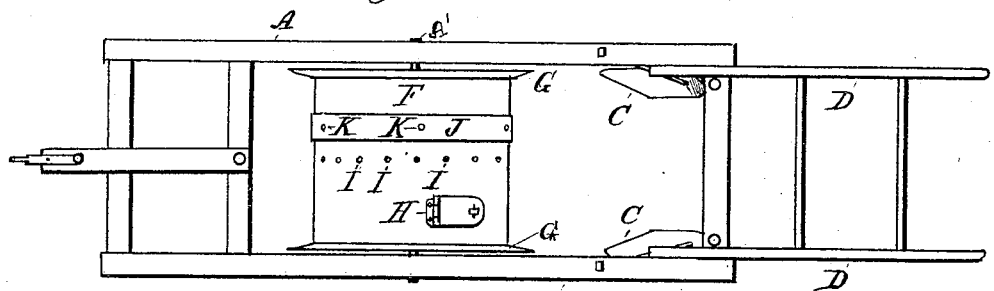
Fig. II.
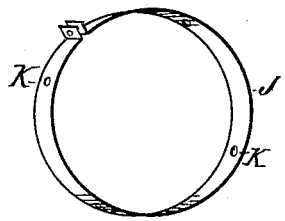
Fig. III.
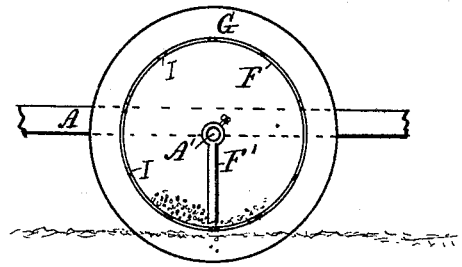
Fig. IV.
WITNESSES:
Robert Kirk.
Robt. S. Millar.
INVENTOR
F. A. Jacobsen.
By
Attorney.

UNITED STATES PATENT OFFICE.

FREDERIK AUGUST JACOBSEN, OF AUSTIN, TEXAS.

CORN AND COTTON PLANTER.

SPECIFICATION forming part of Letters Patent No. 390,678, dated October 9, 1888.

Application filed December 16, 1887. Serial No. 258,108. (No model.)

*To all whom it may concern:*

Be it known that I, FREDERIK AUGUST JACOBSEN, of Austin, in the county of Travis and State of Texas, have invented a new and useful Improvement in Corn and Cotton Planters, which improvement is fully set forth in the following specification and accompanying drawings, in which—

Figure I is a side elevation, partly in section, of my improved corn and cotton planter. Fig. II is a top or plan view of the same; Fig. III, a perspective view of drum-adjusting ring for regulating the feed, and Fig. IV a vertical section of the drum.

The object of my invention is to construct a cheap, simple, and efficient corn and cotton planter; and it consists of a drum or hollow cylinder journaled to a suitable frame, said drum being designed to receive the grain or seed through a suitable door or opening. This drum or cylinder has at each end a peripheral beveled flange, and centrally around the drum a series of holes, and an adjustable strap or band, also provided with holes, so that when this strap is secured around the drum and properly adjusted the seed or grain within the drum will pass through the holes as the drum rotates, all of which will now be set forth in detail.

In the accompanying drawings, A represents an elongated frame, having at its forward end centrally a single shovel, B, and at its rear end two shovels, C, one near each side of the frame.

D are handles on the rear end, by means of which the planter may be manipulated.

Both the forward and rear shovels are held in position by means of adjustable rods E, so that the shovels can be disposed at any angle by the operator.

Centrally is a drum or cylinder, F, journaled to the frame between the beams by means of a non-rotatable shaft, A'. This drum has at each end a peripheral bevel-edged flange, G, which extends out beyond the drum any suitable distance. These flanges are designed to hold up the drum from too close contact with the surface of the ground during the operation of planting. Thus there is afforded opportunity for free egress for the seed, and the furrows or seed-hills will not be too much compressed by the periphery of the drum. The bevel on these flanges comes on the inner edge, and the flanges, while affording support to hold up the drum from too close contact with the ground when the seed is passing from the machine into the seed-hills, will not disturb the surface of the soil to any serious extent, but, on the contrary, will tend to compact it toward the seed-hills.

Near one end of the drum is an opening closed by a door, H, through which opening the seed or grain is deposited in the drum.

Centrally the drum has a series of perforations, I, of suitable size and the proper distance apart to answer the required purpose. An adjustable band or strap, J, is secured around this drum, and this band has also a series of perforations, K, but preferably only half the number or less than are in the drum; or a number of these straps or bands with varying numbers of holes may be provided for each machine, so that one band can be removed and another adjusted if it is desired to change the spaces between the hills. The interior of the drum F carries on the non-rotatable shaft A' a dependent vertically-disposed finger, F', the lower end of which reaches down close to the interior periphery of the drum, and is so located that it is directly over the line of perforations I. The object of this is to keep the seed thoroughly stirred up at the point of discharge and to prevent clogging.

The operation is as follows: The forward single shovels throw up the earth on each side, leaving a furrow. The drum F, which rolls the ridges thus made, follows directly behind the shovel, so that the perforations are directly over the furrow. The seed passes from the perforations into the furrow, and the flanges G on the ends of the drum prevent the soil in the ridges from being removed from the furrow. The two rear shovels follow the drum and throw the dirt back again and completely cover the grain.

The advantages of this device are that the whole structure is light, easily made, and can be regulated or adjusted without difficulty, and no part is liable to get out of order while in use.

What I claim as new is—

In a corn and cotton-seed planter, a centrally-perforated rotating drum on a non-rotating shaft, said drum having at each end a peripheral flange beveled on its inner edge, and within a stationary dependent finger on said shaft, and an adjustable perforated band about it to fit over said central perforations, combined with the frame A, having a single shovel in front of said device and two shovels in the rear, substantially as set forth.

In testimony that I claim the foregoing I have hereunto set my hand, this 30th day of August, 1887, in the presence of witnesses.

FREDERIK AUGUST JACOBSEN.

Witnesses:
R. BIRNSTIEL,
WM. W. WOOD.